United States Patent [19]

Eicher

[11] Patent Number: 4,526,494
[45] Date of Patent: Jul. 2, 1985

[54] PENSTOCK FISH DIVERSION SYSTEM

[75] Inventor: George J. Eicher, Portland, Oreg.

[73] Assignee: Eicher Associates, Inc., Portland, Oreg.

[21] Appl. No.: 369,464

[22] Filed: Apr. 19, 1982

Related U.S. Application Data

[63] Continuation-in-part of Ser. No. 312,189, Oct. 16, 1981.

[51] Int. Cl.³ .............................................. E02B 8/08
[52] U.S. Cl. ........................................ 405/83; 405/81;
405/127; 210/154; 210/162; 119/3
[58] Field of Search ................ 405/77, 78, 80–83, 405/127; 119/3; 210/131, 154, 162, 409; 415/121 G; 210/155

[56] References Cited

U.S. PATENT DOCUMENTS

| | | | |
|---|---|---|---|
| 737,138 | 8/1903 | Ralston | 210/162 |
| 1,110,408 | 9/1914 | Stritzel | 210/154 |
| 1,290,470 | 1/1919 | Yordy | 210/154 |
| 1,511,364 | 10/1924 | Popp | 405/77 X |
| 2,169,249 | 8/1939 | Holmes et al. | 405/83 |
| 2,826,897 | 3/1958 | Vinsonhaler et al. | 405/81 |
| 4,064,048 | 12/1977 | Downs et al. | 405/81 X |

FOREIGN PATENT DOCUMENTS

| | | | |
|---|---|---|---|
| 487803 | 6/1938 | United Kingdom | 210/154 |
| 450012 | 12/1974 | U.S.S.R. | 405/81 |
| 696099 | 11/1979 | U.S.S.R. | 405/82 |

Primary Examiner—Cornelius J. Husar
Assistant Examiner—Nancy J. Stodola
Attorney, Agent, or Firm—Klarquist, Sparkman, Campbell, Leigh & Whinston

[57] ABSTRACT

A fish diversion system for a penstock housing a hydroelectric turbine employs large area screens to shunt fish to a bypass conduit above the turbine. The screens are disposed generally lengthwise of the penstock and inclined upwardly at a shallow angle to maximize water flow velocity along the screens while minimizing the approach velocity normal to the screens. Fish and debris are thus swept along the screens rather than impinged on them. One embodiment uses two screens set end to end. The upstream screen can be tiltable for cleaning. A second embodiment uses a unitary elliptical screen in a cylindrical penstock. The bypass conduit is sized and positioned to minimize bypass water flow volume while maintaining sufficient volume and velocity to discharge fish from the upper portion of the penstock. A funnel-shaped bypass manifold connects the penstock to the bypass conduit.

15 Claims, 9 Drawing Figures

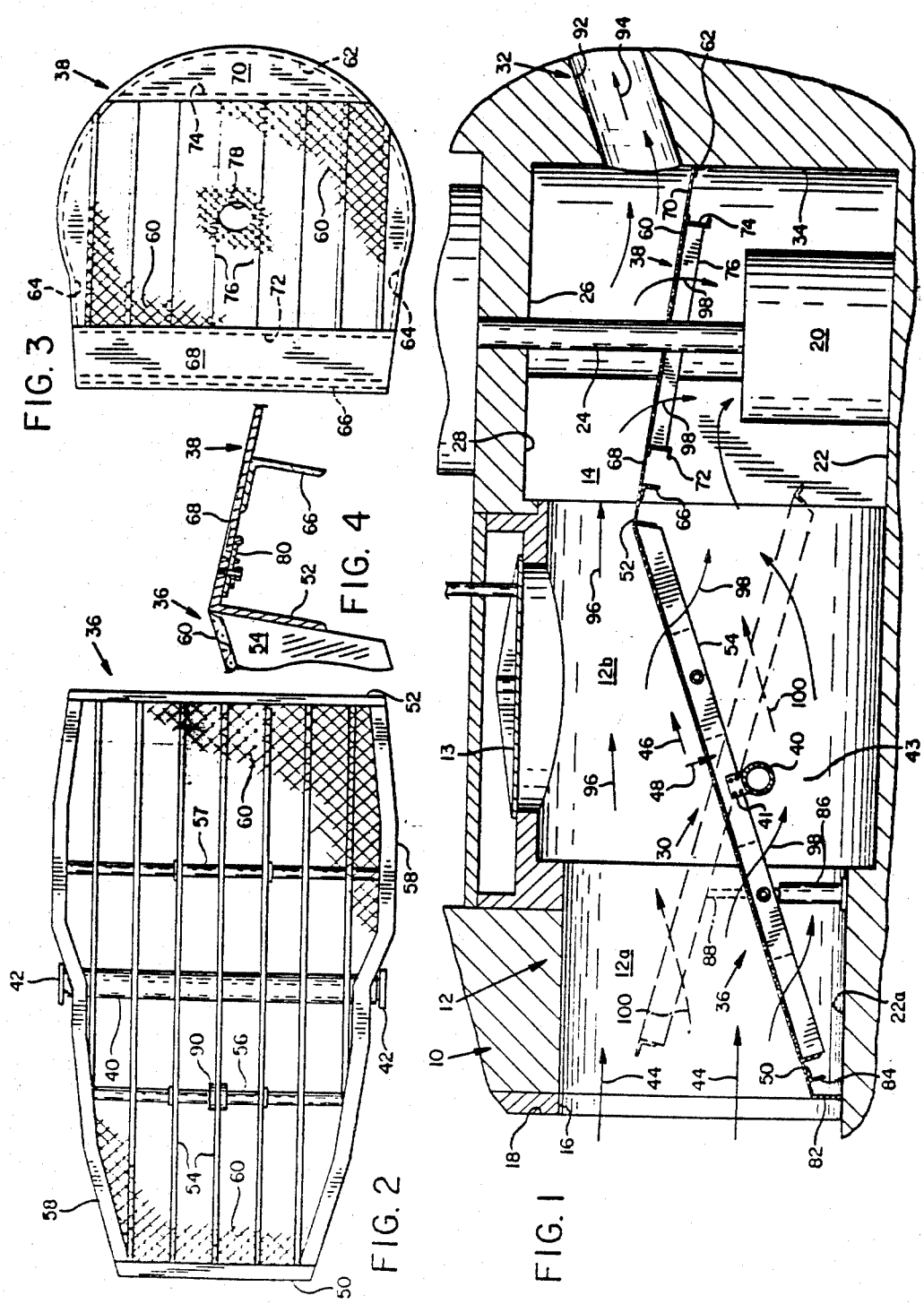

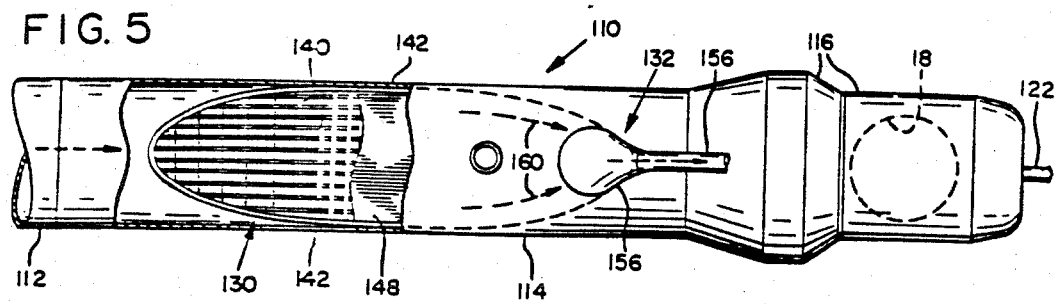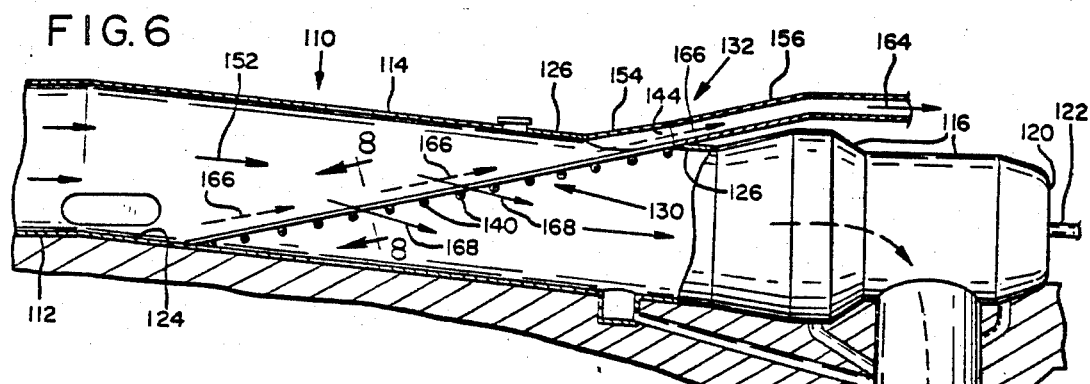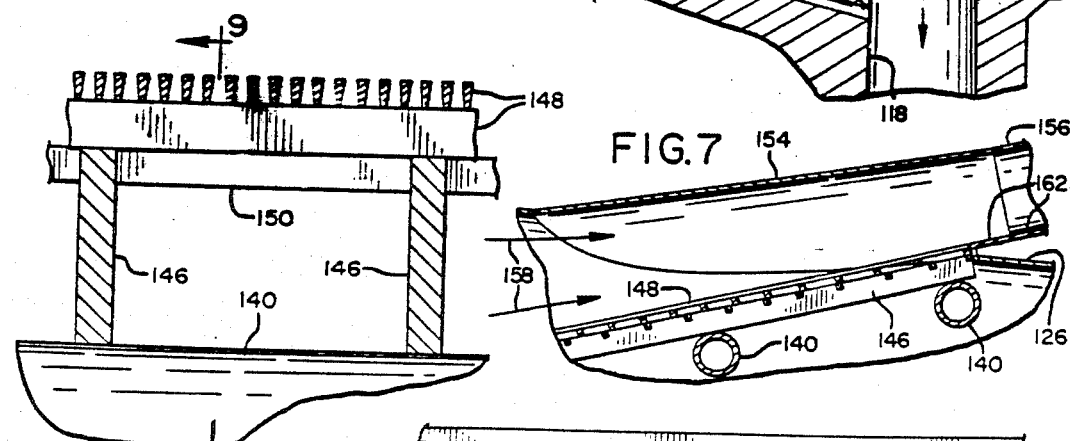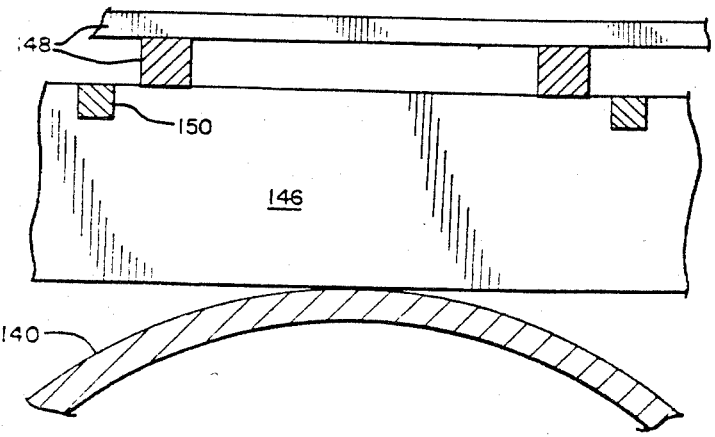

PENSTOCK FISH DIVERSION SYSTEM

This is a continuation-in-part of my copending patent application, Ser. No. 312,189, filed Oct. 16, 1981, entitled PENSTOCK FISH DIVERSION SYSTEM.

BACKGROUND OF THE INVENTION

The invention relates generally to fish diversion apparatus and systems for facilitating movement of fish through dams and more particularly to means for diverting downstream-moving fish away from hydroelectric turbines.

A continuing problem in the exploitation of hydropower is the facilitation of up and downstream movement of fish, particularly anadromous species, through water impoundments. Use of fish ladders and other forms of artificial outlets has aided upstream migration of salmon and other fish.

However, such devices have not proven very useful as downstream migration routes for their offspring. In large bodies of impounded water, salmon and steelhead smolts cannot easily find the artificial outlet or ladder. When water levels are high, many smolts pass over the dam spillways. This is acceptable if the dam is low and water flow sufficient. However, water flow is frequently inadequate during the seasons of downstream migration of the smolts. And, if the dam is very high, the smolts are exposed to highly-nitrogenated water below the dam as well as the possibility of injury during their fall. Many smolts are thus lost. The only other alternative is for the smolts to pass downstream through the generator turbines. However, many more smolts are lost in the process.

To minimize losses of smolts in the turbines, the fish agencies frequently require maintenance of a minimum spillway flow regardless of water supply. However, doing so causes a substantial reduction in power generating capacity, especially during periods of low water flow.

Smolt mortality from the foregoing causes can be 10% or more for each dam in a river that may contain half a dozen or more dams. Such a high cumulative mortality rate makes it difficult to maintain or replenish already depleted populations of anadromous fish. Thus, it is important to find a way to facilitate safe downstream passage of fish through dams without unduly impairing the generating capacity of the dams.

One proposed solution to the foregoing problem calls for positioning a moving or traveling screen across the forebay leading to the penstocks containing the turbines, for example, as disclosed in U.S. Pat. Nos. 2,169,249 and 4,064,048. In top plan view, the moving screen is positioned at a 45° angle to current flow into the forebay. However, such a screen is a large, bulky and expensive apparatus. Also, by virtue of the need for its moving parts to operate continuously to prevent plugging with debris, such a screen is subject to breakdown.

A second proposal involved positioning of a louver screen generally parallel to the flow of water in the forebay across the entrances to all of the penstocks except the one at the downstream end of the forebay. A similar system using a separate bypass is disclosed in U.S. Pat. No. 2,826,897. A wall on the opposite side of the forebay from the louver screen converges toward the downstream end penstock, which is provided with leaf gates to retain fish therein. The object of this system is to move most of the fish with the flow past the louver-screened penstocks to the end penstock provided with a 50 cubic foot per second (cps) bypass. Testing over a two year period disclosed that about 75% of the fish entering the forebay were guided by the louvers into the end penstock. Since this system was only experimental, the turbine was not removed from the end penstock. Although many fish escaped through the bypass, many more fish passed through the turbine and were injured. The large capacity of the bypass reduced generating capacity of the end unit by over 10%. For permanent use, the fish agencies proposed removing the turbine from the end penstock and using the entire 450 cps water supply as a bypass flow. However, doing so would cost greatly in lost generating capacity.

Another approach was to provide an artifical spillway into a sump. A hump-backed skimmer screen was positioned between the reservoir and the sump with its hump at the water surface. Water flowing over the screen carried the fish into the sump. The fish and a portion of the water was discharged into the river below the dam while the rest of the water was pumped back into the reservoir. This screen requires apparatus for raising and lowering it to adjust to variations in water levels. A debris screening system disclosed in British Patent No. 487,803 is likewise susceptible to changes in water level, and therefore would be unreliable as a fish bypass.

It has also been proposed to individually screen the entrances of the penstocks. However, this approach is unsatisfactory because the screens would quickly plug with water borne debris and, by resisting water flow, substantially reduce the efficiency of power generation.

Yet another system that has been tried calls for only screening the upper portion of the entrance of each penstock. Such a screen, when viewed in a side elevational view, is positioned along the downwardly convergent ceiling of the penstock at approximately a 45° angle from horizontal. The screen's upper end contacts the ceiling of the penstock entrance just downstream of the gate well, which serves as a bypass. The lower end of the screen, upstream of the gate well, is spaced well above the floor of the entrance to the penstock. A fixed screen version of this system did not work very well. The approach velocity of water to the screen was about 4 to 6 feet per second. The gate well, having its outlet opening at the level of the surface of the reservoir, had a very low bypass flow. As a result, many of the fish that did not swim beneath the screen were impinged on it and trapped there by the high velocity of the water flow through the screen. The screen was tiltable for cleaning and for releasing trapped fish but many such fish were badly descaled and thus lost. A traveling screen version works better but costs much more to build, operate and maintain. It still diverts no more than about 70% of fish from the turbine and some fish injury still occurs.

Accordingly, there remains a need for a satisfactory means for fish to migrate downstream past dams without passing through the generator turbines.

SUMMARY OF THE INVENTION

One object of the invention is to enable freer downstream passage of fish through dams.

Another object of the invention is to reduce mortality of migrating fish as they pass downstream through hydroelectric dams.

Another object of the invention is to prevent downstream migrating fish from passing through turbines.

A more particular object is to cause fish entering penstocks to be diverted from entry into the turbines.

A further object of the invention as aforesaid is to avoid degrading power generation efficiency.

These objects are fulfilled by a fish diversion system comprising a screening means extending from side to side in the penstock for diverting fish into an upper portion of the penstock and bypass means above the screening means for discharging a portion of the water and any fish therein from the upper portion of the penstock. The screening means extends from the floor in the entrance of the penstock to the downstream end of the penstock above the turbine. It preferably has an upward inclination such that the major velocity component of the downstream water flow into the penstock is parallel to the screening means. Sufficiently large surface area is presented to the water flow to the turbine that the approach velocity of the water to the screening means is less than about 1.8 to 2 feet per second (fps) and the flow velocity along the screening means is twice as great. With the screening means oriented at about 35% upslope (about 19°), approach velocity into the screen is about 1.5 fps and the flow along and over the screen is three times as great. This arrangement avoids impinging the fish and any debris on the screening means. The bypass means has an inlet above the screening means and an outlet at a level relative to the surface of the reservoir sufficient to maintain a flow rate through the bypass and along the surface of the screening means sufficient to discharge the fish from the upper portion of the penstock out through the bypass means, for example, about 4 to 6 feet per second. The bypass means is preferably sized so that only a few percent of the water flow volume into the penstock bypasses the turbines.

In one embodiment, the screening means is preferably constructed in two portions, an upstream portion and a downstream portion. The upstream portion can be tiltable for cleaning away debris, but need not be if it is inclined upwardly at a shallow enough angle and has sufficient surface area that debris is swept along the screen, rather than impinged on it.

In a second embodiment, the screening means is preferably constructed as a unitary structure of elliptical shape, particularly for use in a cylindrical penstock. It extends in a straight line, at the aforementioned upward inclination, from the bottom wall to the top wall of the penstock. The bypass means has its entrance in the top wall of the penstock, adjacent the uppermost end of the screening means, and aligned with the screening means. Such entrance is also preferably funnel-shaped. This configuration progressively constricts and thereby accellerates the flow of water along the screening means as the water approaches and enters the bypass means. Fish and debris are thereby swept at a constant or increasing velocity along the full length of the screen into bypass means. By controlling the level of the end of the discharge pipe in relation to the forebay level, the flow velocity out the bypass can be easily controlled to a desired 6-8 fps.

The foregoing system has proven successful in bypassing fish around generators without loss of fish due to impingement on the screens and without unduly constricting the flow of water through the screen to the turbine. In fact, an unexpected result has occurred from the use of the system in that it is no longer necessary to spill water over the dam in order to enable downstream passage of migrating fish. The entire water flow can be directed through the penstocks with a resultant increase in power generation capacity, even during periods of low water. Moreover, directing most of the water flow through the turbines, rather than spilling a portion of it over the spillway, substantially reduces nitrogenation of the water downstream of the dam. Thus, not only are losses of fish due to passage through the turbines and over the spillways reduced, but downstream losses due to nitrogen narcosis are reduced while power generation is increased.

The foregoing and other objects, features and advantages of the invention will become more readily apparent from the following detailed description of a preferred embodiment which proceeds with reference to the drawing.

BRIEF DESCRIPTION OF THE DRAWING

FIG. 1 is a longitudinal cross-sectional view of a penstock incorporating one embodiment of a penstock screen and fish bypass in accordance with the invention, the tiltable upstream screen being shown in phantom lines tilted into cleaning position.

FIG. 2 is a top plan view of the tiltable upstream screen of FIG. 1, portions of the screen being cut away to disclose underlying construction.

FIG. 3 is a top plan view of the fixed downstream screen of FIG. 1, portions of the screen being cut away to disclose underlying construction.

FIG. 4 is an enlargement of portion of FIG. 1 showing details of the junction between the two screens at their apex.

FIG. 5 is a top view of a cylindrical penstock incorporating a second embodiment of a penstock screen and fish bypass in accordance with the invention, a portion of the penstock being cut away to show details of the screen.

FIG. 6 is a side view of the penstock of FIG. 5, a portion being cut away to show details of the screen.

FIG. 7 is an enlargement of a part of FIG. 6 showing the relationship of the downstream end of the screen and the entrance to the bypass tube.

FIG. 8 is a full-scale cross-sectional view of the screen taken along line 8—8 in FIG. 6.

FIG. 9 is a longitudinal-sectional view taken along line 9—9 in FIG. 8.

DETAILED DESCRIPTION OF PREFERRED EMBODIMENT

FIG. 1 Embodiment

Referring to FIG. 1, a typical penstock 10 is a structural concrete cul-de-sac comprising a horizontally-oriented cylindrical conduit or draft tube 12 intersecting a vertically oriented cylindrical chamber 14. The draft tube 12 forms an entrance to the penstock and can include conduit portions 12a, 12b of different diameters, the larger portion 12b including a normally-closed hatchway 13. The entrance to the penstock ordinarily includes a head gate 16 which is retracted upwardly into a gate well 18 to admit water to the penstock. A turbine 20 is mounted on the floor 22 of the cylindrical chamber for rotation about a vertical shaft 24 extending through the chamber ceiling 26 at a position concentric with the chamber sidewalls 28. Submerged at the base of a dam (not shown), the penstock 10 is filled with water under pressure to establish a water flow through the turbine 20, causing it to rotate on shaft 24.

The fish diversion system of the present invention comprises a screening means 30 for diverting fish into an upper portion of the penstock and a bypass means 32 for discharging a portion of the water in the upper portion of the penstock and any fish therein from the penstock. The screening means 30 extends downstream at a shallow upward inclination from the floor of the penstock 22a near the head gate to the downstream end wall 34 of the penstock 34 below the bypass means 32.

The screening means is preferably constructed in two parts: an upstream portion 36 and a downstream portion 38, best seen in FIGS. 2 and 3, respectively. The combined surface area of the two screen portions is much greater than the cross-sectional area of conduit 12a, on the order of three times as large.

The upstream screen portion 36 extends from side to side across the draft tube. It is preferably mounted on a horizontal pivot shaft 40 by means of brackets 41. Bearing housings 42 on each end of the shaft are secured to opposite sidewalls 44 of conduit portion 12b. Portion 36 has an outer frame structure formed of structural frame angle members 50, 52, 58 contoured to approximately a pear shape to conform to the shape of the sidewalls of conduit portions 12a, 12b.

The shape of the screen portions can vary in accordance with the cross sectional configuration of the penstock and the angle at which the screens are positioned therein. In turn, the angle of the screen portions in the penstock and their surface areas are adjusted to insure that fish and debris are swept along the screens rather than impinged on them and vary with the velocity of water flow 44 into the penstock and out the bypass. The upsloping screen translates flow 44 into a flow component 46 parallel to the upstream screen portion and a flow component 48 through the screen normal to component 46. The resultant velocity of flow component 46 along the screen is preferably more than twice the velocity of flow component 48 through the screen. The surface area and the angle of the screens are adjusted to maintain the velocity of water flow normal to the screens safely below the approach velocity at which fish and debris would be impinged on or plastered against the screens.

In the illustrated embodiment, which is merely an example, the upstream screen portion is positioned at a 35% upslope, or about 19.3° angle from horizontal, for a horizontal water flow 44 of water into the penstock at a velocity of 4–6 fps. Approach flow velocity is about 1.8 feet per second, at which no impingement occurs.

Returning to the structure of the upstream screen portion, the outer periphery of the frame includes parallel upstream and downstream end frame members 50, 52 extending between mirror-image side frame members 58. Extending lengthwise between members 50, 52 are a series of spaced-apart, parallel flat rib members 54 arranged with their narrow dimension normal to the water flow. Two tubular members 56, spaced at intervals between the end members 50, 52 extend through the rib members 54 and are secured at their ends to the side frame members 58. Secured atop the rib members 54 and supported thereby is a screen 60. Although the screen is represented symbolically as a grid-type screen, it is preferable to use Johnson wedge wire screen in which the wires are oriented parallel to ribs 54. The preferred screen has 2 mm. width wires and 2 mm. spacing between the wires.

Similarly, the downstream screen portion 38 is contoured to conform to the cylindrical shape of turbine chamber 14. It is set in the chamber at approximately a 15%, or 8.5°, downslope and, accordingly, the downstream portion of its outer frame is formed of a frame angle member 62 having a generally elliptical shape. The upstream portion is framed along its sides by two straight frame angle members 64 and at its upstream end by a straight angle member 66 extending horizontally from side to side across the downstream end of conduit 12b. The side frame members are welded to the ends of the elliptical frame member 62 and converge slightly to conform to sides of the penstock. A trapezoidal plate member 68 and a crescent-shaped plate member 70 extend from side to side across the top of screen portion 38 at its up and downstream ends. A pair of spaced-apart channel members 72, 74 extend from side to side across the outer frame along the inner margins of plates 68, 70, respectively. Spaced-apart, parallel, flat rib members 76, similar to rib members 54, extend lengthwise between channel members 72, 74. Johnson wedge wire screen 60 is secured atop ribs 76. At the center of the downstream screen portion, between the centermost rib members 76, is a circular opening 78 through the screen for turbine shaft 24. Screen portion 38 is removably secured in a fixed position in the turbine chamber by brackets (not shown).

As mentioned above, the upstream screen portion 36 is mounted for tilting on shaft 40. Accordingly, referring to FIG. 4, its downstream angle member 52 has a flat strip 80 bolted to its underside in position to separably abut the underside of the upstream end of plate 68. Referring to FIG. 1, at the upstream end of screen portion 36, an angled plate member 82 is secured to the floor of the conduit 12a just downstream of the head gate. When viewed from upstream, member 82 has a crescent shape to conform to the curved floor 22a of conduit 12a. The upper end of member 82 is angled downstream and has a reinforcing angle member 84 welded to its underside in position for frame angle 50 to rest on it. A hydraulic cylinder 86 is pivotally mounted (not shown) at its lower end to the floor of conduit 12a. Its ram 88 has a clevis end 90 connected to tubular member 56. Extending the ram raises the upstream end of screen portion 30 to a cleaning position, shown in phantom lines in FIG. 1.

Bypass means 32 comprises a bypass pipe 92, with an inlet opening connected into an upper portion of the turbine chamber above screen portion 38, extending through end wall 34. The bypass pipe could equally as well be connected to the turbine chamber throufh ceiling 26. Pipe 92 extends at an upward inclination in the downstream direction to an outlet (not shown) at a level sufficiently below the surface of the water behind the dam to provide a water flow, indicated by arrow 94, from the upper portion of the penstock at a velocity greater than that flowing over the apex of the screen, or 6–10 fps. The bypass pipe is sized relative to conduit 12a such that only a small portion of the water entering the penstock escapes via the bypass. In one example, conduit 12a has a diameter of 10 feet and bypass pipe 92 has a diameter of 2.5 feet. The resultant water flows are approximately 450 cubic feet per second entering the penstock and about 50 cubic feet per second flowing out through the bypass pipe.

Operation of FIG. 1 Embodiment

In normal operation, the head gate 16 of the penstock is raised and the penstock is completely filled with water under pressure determined by the head behind the dam. Water flows horizontally into the penstock through conduit 12a, as indicated by arrows 44. As the water flows downstream through the draft tube, a major component 46 of water flow velocity is along the upstream portion of the screening means, carrying any fish and debris into the upper portion of the penstock as indicated by arrows 96. At the same time, most of the volume of water flows through the upstream and downstream screen portions 36, 38, as indicated by arrows 98, at a substantially lower velocity, as indicated by arrow 48. The approach velocity into the screen, which is a function of the volume passing through it and into the turbine in relation to screen area, is readily controlled to about 1.5 fps or less, depending upon demand by the turbine. The approach velocity of water to the screens is thus less than 1.8 to 2.0 fps. This velocity is low enough to prevent impingement of fish and debris against the screen while the flow velocity along the screen, toward the bypass means, is sufficient to sweep the fish along into the upper portion of the penstock and discharge them out through the bypass pipe 92. The constricted passageway between the apex of the screen portions and the ceiling of conduit 12a helps retain the fish in the space above screen portion 38. The fish and water can be discharged at the outlet of pipe 92 into a fish ladder if such is available. Otherwise, the fish and water are simply discharged into the water below the dam.

If a steeper slope of screen is used than that shown in the preferred embodiment, the screen portions may require occasional cleaning. To do so without interrupting the operation of the turbine, cylinder 86 is actuated to raise the upstream screen portion to the cleaning position shown in phantom lines shown in FIG. 1. Such portion is preferably tilted for cleaning to a 25% or 14° downslope. In this position, a portion of the water flow into the penstock is from bottom to top through the screen as indicated by arrows 100. Such flow removes any debris impinged on the top of the screen and flushes it out of the penstock through the turbine 20.

FIG. 5 Embodiment

Referring to FIGS. 5 and 6, a second type of penstock 110 comprises a draft tube 112 feeding into a slightly downsloping cylindrical penstock chamber 114 and terminating in an intake to a horizontally-oriented, cylindrical turbine housing 116. A vertical exhaust tube 118 is positioned in the bottom wall of the turbine housing. A turbine (not shown) is mounted in the penstock's end wall 120 for rotation about a horizontal shaft 122 for driving a generator (not shown) outside the housing. In this particular example, all of the tubular structure is formed of structural steel plate but could also be formed of structural concrete. As in the first embodiment, the penstock has a headgate (not shown) at the entrance to the draft tube. In operation, the headgate is open and the penstock is filled with water under pressure to establish a downstream water flow through the turbine causing it to rotate on shaft 122.

The fish diversion system of this embodiment of the invention comprises a screening means 130 and bypass means 132 for discharging a portion of water in the upper portion of the penstock and any fish therein from the penstock. The screening means 130 extends downstream at a shallow, for example, 18°, upward inclination from the floor of the penstock 124 to its ceiling 126, below the bypass means 132 and above the turbine intake.

The screening means of this embodiment is a unitary structure of elliptical shape, best seen in FIG. 5. Like the first embodiment, the screening means 130 provides a screened surface which is shallowly inclined relative to water flow through the penstock and has an area much greater than the cross-sectional area of tube 114, to proportion the approach velocity of water flow to the screen and the flow velocity along it so as to avoid impinging fish and debris on the screen.

In this embodiment, the screen is preferably fixed in place, but may be made tiltable if so desired. The support structure of the screening means comprises a series of cylindrical support pipes 140 extending horizontally from side to side across the penstock. Pipes 140 are secured at their ends to the penstock sidewalls 142 and are spaced apart along a straight line extending at the aforementioned shallow upward inclination from the floor of the penstock to a position immediately below the entrance 144 to bypass means 132. Referring to FIGS. 7-9, a series of rectangular members 146, standing on edge with their broad side faces parallel to current flow, are connected to the upper sides of pipes 140. Members 146 are oriented normal to pipes 140 and are spaced equidistantly apart to form a uniform grid work supporting a wedge wire screen 148, best seen in FIGS. 8 and 9. Members 146 are interconnected along their upper margins by uniformly-spaced bar members 150 extending parallel to pipes 140. The screen 148 is of the same type as screen 60 and is likewise oriented parallel to the direction of water flow 152 in the penstock.

The bypass means 132 comprises a funnel-shaped manifold 154 in the top wall 126 of the penstock, as best seen in FIG. 7. Referring briefly to FIG. 6, it should be noted that the screening means 130 is inclined toward the penstock's top wall 126, proceeding in the downstream direction, to form a triangular space in the upper portion of the penstock. This shape vertically constricts and thereby accelerates the flow of water along the screen as it approaches the entrance 144 to the bypass means. The funnel shape of manifold 154 continues this vertical constriction of water flow until the water reaches bypass pipe 156. Referring to FIG. 5, the elliptical shape of the screening means and the sidewalls of the cylindrical penstock 114 likewise cooperate to laterally constrict the flow of water along the screen as it approaches the bypass means 132, as indicated by arrows 160. Manifold 154 is likewise funnel-shaped in the horizontal dimension so as to continue this laterally constrictive effect.

The bottom wall 162 of bypass pipe 156 and manifold 154 is aligned with the upper surface of screen 148. A first portion of bypass pipe 156, connected to manifold 154, is aligned generally with the screen to provide a straight line flow of water along the screen into the bypass means, as indicated by arrows 166. Downstream segments of the bypass pipe can be oriented as necessary to position its outlet for discharging fish and water and for controlling the rate of flow 164 through the bypass means as previously discussed.

Operation of FIG. 5 Embodiment

The FIG. 5 embodiment operates, for the most part, like the FIG. 1 embodiment. The velocity of flow along the screen as indicated by arrows 166 is greater than the component of flow velocity through the screen, indicated by arrows 168. Flow component 168 is maintained below the approach velocity at which fish and debris would be impinged on the screen.

The principal difference between the operation of the first and second embodiments is the progressively constrictive relationship of the inclined elliptical screen, the cylindrical sidewalls 142 and top wall 126 of the penstock and the funnel-shape of the manifold 154. The resultant acceleration of water flow along the screen helps clean the screen over its entire length and better insures that fish and debris will be swept by the current flow in the upper portion of the penstock into the bypass pipe 156 without impinging on the screen. As a result, the bypass pipe can be much smaller in proportion to the penstock diameter than the FIG. 1 embodiment allows. In one example, the penstock has a diameter of 12.5 feet and the bypass pipe is 16 inches in diameter. The resultant water flows are approximately 500 cubic feet per second entering the penstock and about 10 cubic feet per second flowing out through the bypass pipe at a velocity of 7 feet per second.

The foregoing fish diversion systems can be installed in each penstock at a hydroelectric plant. Alternatively, such systems can be installed solely in the penstock at the downstream end of the forebay and the fish diverted thereto from the other penstocks by, for example, the louver system described in the background of the invention. In the first arrangement, no more than about 2% of the water flow into each penstock will be lost through the bypass means, reducing generating efficiency of each penstock/turbine unit by a corresponding amount. In the latter system, the generating efficiency of only the last unit will be reduced by that amount. In either case, the losses are more than made up for by the ability to direct up to the entire downstream flow of water through the turbines without disrupting the downstream migration of the fish. If desired, additional generating units can be added to a dam to utilize peak water flows as well. Because all of the water can pass through the turbines, without any need to spill water over the dam to facilitate downstream movement of fish, nitrogenation of waters below the dam by spillwater is significantly reduced except during periods of peak stream flow.

Because the entire system is under water pressure at all times and responsive only to that influence, varying forebay water levels are immaterial, and no necessity exists for automatic or manual controls to compensate for them. Because essentially no moving parts are involved, operation and maintenance costs are virtually eliminated. Use of the penstock itself as a support structure obviates requirements for construction of auxiliary concrete or steel structures with their attendant costs and requirements for space which is usually scarce in such arrangements.

Having illustrated and described two alternately preferred embodiments of my invention, it should be apparent to those skilled in the art that such embodiment may be modified in arrangement and detail without departing from the invention.

I claim all modifications which come within the spirit and scope of the following claims.

1. A penstock fish diversion system comprising:
a penstock spaced below a water surface, including walls defining a cul-de-sac having an entrance at an upstream end of the penstock for admitting a downstream flow of water at a first velocity, a ceiling, a floor, opposite sidewalls and an end wall at a downstream end of the penstock, for containing said water under pressure for driving a turbine;
a turbine intake in the penstock;
screening means extending from side to side in said penstock above the turbine intake for diverting fish into an upper portion of the penstock; and
bypass means in the penstock defining an enclosed passageway spaced below the surface of the water and having an intake opening above the screening means for discharging, under pressure greater than atmospheric pressure, a portion of the water and any fish therein from the upper portion of the penstock to bypass said fish around the turbine intake.

2. A fish diversion system according to claim 1 in which the screening means extends from the floor in said entrance to the downstream end of the penstock at an upward inclination such that a major component of the downstream water flow velocity is parallel to such portion.

3. A fish diversion system according to claim 1 or 2 in which the screening means is sized and oriented relative to the downstream flow of water into the penstock so that the water flow component toward the screening means has an approach velocity less than a velocity at which fish would be impinged on the screening means.

4. A fish diversion system according to claim 2 in which said inclination is about 35% slope along an upstream portion of the screening means.

5. A fish diversion system according to claim 1 in which the screening means includes a upstream portion mounted for tilting between a position for diverting fish into an upper portion of the penstock and a cleaning position at an downward inclination such that a component of the downstream water flow passes from bottom to top through said upstream portion to effect cleaning thereof.

6. A fish diversion system according to claim 1 in which:
the screening means includes an upstream portion and a downstream portion,
the upstream portion extending downstream at a shallow upward inclination from the floor inside the entrance to the penstock to an apex near the ceiling of the penstock just upstream of the turbine intake; and
the downstream portion extending at a shallow downward inclination from said apex to said downstream end below an inlet opening to said bypass means.

7. A fish diversion system according to claim 1 in which the bypass means is arranged to provide a water flow of about 4 to 6 feet per second.

8. A fish diversion screen for a penstock having a floor, a pair of opposite sidewalls, an end wall at a downstream end, a draft tube of a predetermined cross-sectional area at an upstream end for admitting water to the penstock, and a turbine in the downstream end, the screen comprising:
a downstream screen portion extending side to side across the downstream end of the penstock at a position spaced above the turbine; and
an upstream screen portion extending side to side across the upstream end of the penstock and extending in the downstream direction at a shallow upward inclination from the floor of the draft tube to the downstream screen portion;
said upstream screen portions being shaped to conform to the walls of the penstock when positioned at said inclination;
the screen portions being separable along an interface upstream of said turbine intake and the upstream screen portion being mounted on a shaft means upstream of said interface for tilting downwardly at its downstream end to a cleaning position;

the shaft means including means for tilting the upstream screen portion.

9. A fish diversion screen according to claim 8 in which the upstream screen portion includes an upstream end separably interfacing with a floor-mounted plate member extending side-to-side across a lower portion of the draft tube so that the upstream end can be raised when the upstream screen member is tilted to said cleaning position.

10. A fish diversion screen according to claim 8 in which said shallow upward inclination is about a 35% slope and the screen portions have a surface area of about 3 to 4 times the cross-sectional area of the draft tube.

11. A fish diversion system according to claim 1 in which the penstock has cylindrical wall means and the screening means has an elliptical shape conforming to the wall means.

12. A fish diversion system according to claim 1 in which the screening means extends at an upward inclination in a downstream direction from said floor to said ceiling and the bypass means is positioned in the ceiling.

13. A fish diversion system comprising:

wall means defining an enclosed penstock for supplying water to a turbine, the penstock being spaced below an atmospheric water surface for filling and internally pressurizing the penstock with water at a pressure greater than atmospheric pressure for driving the turbine;

a screening means within and extending across the penstock in conformity with said wall means, at an inclination to a downstream water flow in the penstock, for diverting fish away from the turbine, and a bypass means defining a closed conduit in the wall means of the penstock, the conduit being spaced below the water surface and having an intake opening adjacent a downstream end of the screen for discharging, under pressure greater than atmospheric, a portion of the water flow and the fish from the penstock to bypass the fish around the turbine.

14. A fish diversion system according to claim 13 in which the penstock has cylindrical wall means and the screening means has an elliptical shape conforming to the wall means;

the screening means being inclined relative to the downstream water flow so that a component of downstream water flow normal to the screening means has an approach velocity less than the velocity at which fish would be impinged thereon.

15. A fish diversion system according to claim 13 or 14 in which the bypass means includes means inwardly tapered for constricting the portion of water flow discharged from the penstock through the bypass means and thereby accelerating said portion of water flow to a discharge flow velocity of at least four feet per second.

* * * * *